United States Patent [19]

Kiyonaga et al.

[11] 4,058,650
[45] Nov. 15, 1977

[54] BACK MATERIAL OF METAL BAND SAW HIGH IN FATIGUE STRENGTH

[75] Inventors: Kingo Kiyonaga; Ryousei Ago; Sei Furuichi, all of Yonago, Japan

[73] Assignee: Hitachi Metals, Ltd., Japan

[21] Appl. No.: 704,085

[22] Filed: July 9, 1976

[30] Foreign Application Priority Data

July 11, 1975   Japan .................. 50-84458

[51] Int. Cl.² ............................................ C22C 38/06
[52] U.S. Cl. .................................. 428/683; 75/124;
   75/126 C; 75/126 E; 75/126 F; 75/126 H;
   75/128 B; 75/128 G; 75/128 V; 75/128 W;
   148/36
[58] Field of Search ..................... 29/196.1; 148/36;
   75/124, 126 E, 126 F, 126 C, 126 H, 128 G, 128
   V, 128 W, 128 B; 83/661; 428/683

[56] References Cited

U.S. PATENT DOCUMENTS

| 2,837,421 | 6/1958 | Kron ........................... 148/36 |
| 2,968,549 | 1/1961 | Brady et al. ................ 75/126 E |
| 3,044,872 | 7/1962 | Hayes et al. ................ 75/126 C |
| 3,907,553 | 9/1975 | Nagumo et al. ............ 75/126 F |
| 3,918,928 | 11/1975 | Kiyonaga et al. ......... 75/126 E |
| 3,930,426 | 1/1976 | Berggren et al. .......... 76/112 |

Primary Examiner—Arthur J. Steiner
Attorney, Agent, or Firm—Craig & Antonelli

[57] ABSTRACT

A back material of a metal band saw high in fatigue strength which consists essentially of, by weight, 0.20 – 0.33% C, up to 1.5% Si, up to 1.5% Mn, 3.5 – 6.5% Cr, 0.05 – 0.40% V, 0.05 – 0.10% Al, 0.02 – 0.30% Nb, at least one of 1.0 – 3.0% Mo and up to 4.0% W and the balance Fe and impurities, the sum of (% Mo) + ½ (% W) being within the range of 1.0 – 3.0%.

20 Claims, 1 Drawing Figure

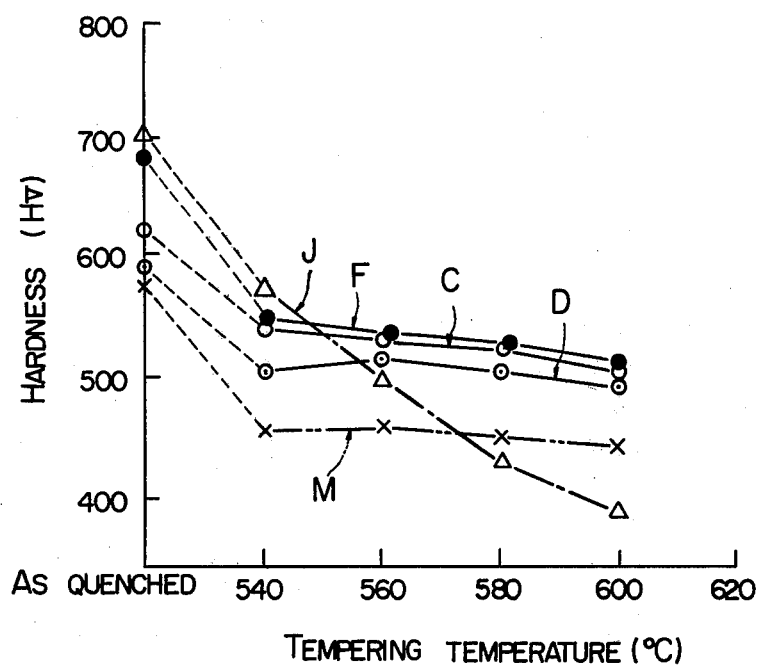

BACK MATERIAL OF METAL BAND SAW HIGH IN FATIGUE STRENGTH

BACKGROUND OF THE INVENTION

This invention relates to a back material of a metal band saw which is welded with a blade material of high speed steel.

Hitherto, the metal band saws used are those which comprise a high speed steel blade material and an inexpensive low grade steel back material which are electron beam welded to save the expensive high speed steel. However, the conventional metal band saws which comprise a blade material and a back material such as AISI-1055, AISI 6150 etc., have the following problems: That is, when such metal band saws are quenched at a temperature of about 1200° C and then tempered at a temperature of 540° - 580° C which are suitable heat treating conditions for the high speed steel of the blade material, since there are high quenching and tempering temperatures for the conventional back materials, toughness and hardness are lowered to cause reduction in tensile strength as back materials and furthermore cracks are formed in the back material part due to insufficient fatigue strength to cause breakage. Recently, materials difficult to be cut such as preharden steels and die steels which are high in hardness have been increasingly used as materials to be cut and high speed steels such as AISIM 40 series have been developed for cutting of materials which are more difficult to cut. Therefore, materials of higher tensile strength and toughness are required as back materials. Use of back materials of low tensile strength causes bend of cut surface. Moreover, metal band saws are used as endless band saws by driving with two wheels. Therefore, the back materials are subjected to repeated tensile stresses caused by bending and breakages occur in the back material part if fatigue strength of the back material is low. The metal band saws comprising a high speed steel blade material to which the conventional back material is welded have the problems as mentioned above. Thus, even in case the high speed steel of the blade material can still be used, the metal band saws may become unusable because of breakage in the back material part.

SUMMARY OF THE INVENTION

It is the object of this invention to provide a back material of metal band saw which solves said problems, causes no bend of cut surface and has a long cutting life.

Conventionally, the first requirement as a back material of metal band saw is inexpensiveness, but recently the following are required in view of using conditions.
1. Decarburization and cementation in weld part must be small.
2. Even when subjected to the same heat treatment as to the high speed steel, it must have a sufficient toughness.
3. Even when tempered at a high tempering temperature which is the same as for the high speed steel, it must have a hardness of around $H_RC$ 50 to obtain a sufficient fatigue strength.
4. It must have a good weldability.

This invention has improved the back materials disclosed in Japanese Patent Publication No. 16008/74 filed by the inventors and has further provided the back material of higher performance.

BRIEF DESCRIPTION OF THE DRAWING

The accompanying drawing shows the relation between tempering temperature and hardness of specimens having a thickness of 1.0 mm, a width of 25 mm and a length of 25 mm which were oil quenched from 1200° C and then repeatedly tempered to a temperature of 540° - 600° C.

DESCRIPTION OF THE INVENTION AND THE PREFERRED EMBODIMENTS

The back material of metal band saw of this invention is characterized by consisting essentially in weight percent of 0.20 - 0.33% of C, up to 1.5% of Si, up to 1.5% of Mn, 3.5 - 6.5% of Especially, 0.05 - 0.40% of V, 0.05 - 0.10% of Al, 0.02 - 0.30% of Nb, one or two of 1.0 - 3.0% of Mo and up to 4.0% of W, 1.0 - 3.0% of (% Mo) + ½ (% W) and the balance Fe and impurities. Furthermore, said back material may additionally contain one or two of up to 1.4% of Co and up to 1.5% of Ni to increase fatigue strength or toughness of matrix. Especially, addition of Mo is more preferable than that of W in the metal band saw back material of this invention.

The reasons for restriction of the contents of the components in this invention will be explained below.

C together with Cr, Mo, W, V, Nb, etc. forms carbides and at the same time a part of C dissolves in the matrix to strengthen it. C is most effective for increasing hardness, but more than 0.33% of C results in deterioration of toughness by quenching at a high temperature. When the content of C is less than 0.2%, sufficient hardness cannot be obtained and other alloying elements must be contained in extremely large amounts in order to obtain a hardness enough to withstand the use as a back material. This is not economical. Therefore, the content of C is limited to 0.2 - 0.33%, preferably 0.23 - 0.30%.

Cr forms a carbide and a part of Cr dissolves in matrix to increase hardenability and corrosion resistance to give good effect on fatigue strength. With increase in Cr content the activity of C decreases and diffusion of C from the back material part into the blade material portion is decreased to cause reduction of decarburization in the back material part and cementation in the high speed steel part. In order to obtain these effects, the Cr content may be more than 3.0%, but when it is less than 3.5% the temper strength at about 700° C is difficultly lowered. Therefore, even if the butt welded portion of both ends of the saw for producing an endless band saw is annealed, the hardness of the portion is not reduced and toughness of the butt welded portion is deteriorated to cause breakage. Therefore, the lower limit of Cr content is 3.5%. When the Cr content is more than 6.5%, the temper hardness is conspicuously reduced with change in tempering temperature and back materials of stable quality cannot be obtained. Thus, the Cr content is limited to 3.5 - 6.5%. Preferred range is 4.0 - 6.0%.

V forms a carbide and is effective for decreasing the activity of C. The carbide of V difficultly dissolves in austenite and has the effect of preventing grain growth. When the V content exceeds 0.4%, reduction in fatigue strength occurs and so the upper limit is 0.4%. In order to attain the effect of preventing the grain growth, at least 0.05% is necessary in view of the relation with Nb content. Thus, the V content is limited to 0.05 - 0.4%. More preferred range is 0.2 - 0.4%.

Mo forms a carbide and is next to V and Nb in the effect for increasing hardness. When Mo is in a suitable blending relation with Cr, temper hardness does not change so much even if the tempering temperature of about 540° - 580° C changes in this range and thus the tempering temperature can easily be controlled. This means that even when the tempering temperature of the high speed steel blade is adjusted for adjusting the hardness of the edge of the blade, the back material can be used in a constant efficiency and hence Mo in a suitable content imparts an useful characteristic to the back material. Such effect can be attained when the Mo content is 1.0 - 3.0% so far as the Cr content is within 3.5 - 6.5%. Besides, Mo of more than 3.0% becomes expensive. W is a carbide forming element and it has been confirmed in this invention that W has the similar effect to that of Mo. However, W is more expensive than Mo and Mo is preferred than W for metal band saw back material. In order to obtain the effect by using W which is the same as obtained by Mo, the W content must be twice the Mo content, but when the W content exceeds 4.0% the toughness is decreased and so the W content is limited to up to 4.0%. However, as the contents of Mo and W, it is necessary that the back material contains one or two of 1.0 - 3.0% of Mo and up to 4.0% of W and (% Mo) + ½ (% W) is 1.0 - 3.0%. The more preferred range of Mo is 1.4 - 2.6% and when Mo is contained together with W it is preferred that Mo is in the range of 1.0 - 2.4%, more preferably 1.6 - 2.4%, W is in the range of 0.8 - 2.0% and (% Mo) + ½ (% W) is 1.0 - 3.0%.

Nb forms a carbide of a high melting point and has the effect of preventing the coarsening of crystal grains even when the back material is heated to about 1200° C which is the quenching temperature of the high speed steel. This effect is recognized from the content of 0.02% and with increase in the content the crystal grains are refined and at the same time the toughness is also extremely improved, but improvements in these effects are small even when the content exceeds 0.30%. Therefore, the Nb content is limited to 0.02 - 0.30%. Si and Mn are used as deoxidizer and when each content of Si and Mn exceeds 1.5%, weldability is adversely affected. Therefore, each content of Si and Mn is limited to up to 1.5%. The more preferred range of Mn is up to 1.0% and that of Si is up to 0.8%.

Ni does not form carbide and dissolves in the matrix to strengthen the matrix. Presence of Ni in the back material gives substantially no effect on the hardness after quenching and tempering treatments which are the same as those on the high speed steel of the blade material. However, Ni in the back material improves the toughness and decreases dispersion of fatigue strength. Furthermore, Ni has the effect of improving butt weldability which is necessary for making the metal band saw into an endless belt. Ni is added to obtain these effects and when the content exceeds 1.5%, said effects reach the saturation. Therefore, the Ni content is limited to up to 1.5%. The more preferred range is 0.4 - 1.2%.

Like Ni, Co also does not form carbide and dissolves in the matrix to strengthen it. In the case of the steel of this invention, there is recognized no effect of Co on the temper hardness at 520° - 580° C. However, Co has the effect of homogeneously strengthening the matrix ferrite to increase fatigue strength. Said effect reaches the saturation with the Co content exceeding 1.4%. Therefore, the Co content is limited to up to 1.4%. The more preferred range is 0.4 - 0.9%.

Al prevents the generation of pin holes in the electron beam welded portion of the back material and the blade material. For this purpose, content of at least 0.05% is required, but there is no need of adding more than 0.1%. Thus, the Al content is limited to 0.05 - 0.1%.

This invention will be explained in detail by the following Examples.

Table 1 shows chemical compositions of the steel of this invention, the comparative steels and the conventional steels as the back materials and high speed steel as the blade material. In table 1, A, B, C, D, E, F, G, H and I are the back materials of this invention, J and K are those of the comparative steels and L, M and N are those of the conventional steels. O corresponds to the blade material high speed steel AISI-M2.

Table 2 shows the characteristics of each back material shown in Table 1 and the results of fatigue test as actual metal band saws.

The tensile test was conducted by dipping a sheet of 1.0 mm in thickness as the tensile test specimen in a salt bath at 1200° C for 20 seconds, oil quenching the sheet, tempering it two times at 560° C × 1 hr and working it into a test specimen of sheet of 10 mm in width, 50 mm in gauge length and 0.8 mm in thickness.

Table 1

| Mark | C | Si | Mn | Cr | V | Al | Nb | Mo | W | Ni | Co | Remarks |
|---|---|---|---|---|---|---|---|---|---|---|---|---|
| A | 0.28 | 0.36 | 0.82 | 5.06 | 0.30 | 0.07 | 0.09 | 2.20 | — | — | — | Steel of this invention |
| B | 0.29 | 0.35 | 0.80 | 5.12 | 0.29 | 0.06 | 0.12 | 1.62 | 1.04 | — | — | " |
| C | 0.25 | 0.26 | 0.68 | 5.04 | 0.36 | 0.06 | 0.10 | 2.03 | — | 0.60 | — | " |
| D | 0.26 | 0.36 | 0.73 | 5.06 | 0.33 | 0.07 | 0.12 | 2.06 | — | — | 0.86 | " |
| E | 0.27 | 0.37 | 0.79 | 5.10 | 0.33 | 0.06 | 0.10 | 2.10 | — | 0.46 | 0.44 | " |
| F | 0.25 | 0.25 | 0.69 | 5.00 | 0.37 | 0.07 | 0.11 | 1.64 | 1.05 | 0.60 | — | " |
| G | 0.27 | 0.40 | 0.69 | 5.20 | 0.34 | 0.06 | 0.05 | 1.60 | 1.10 | — | 0.70 | " |
| H | 0.27 | 0.41 | 0.70 | 5.10 | 0.36 | 0.07 | 0.05 | 1.58 | 1.20 | 0.50 | 0.46 | " |
| I | 0.28 | 0.37 | 0.36 | 5.00 | 0.30 | 0.06 | 0.06 | — | 2.0 | — | — | " |
| J | 0.30 | 0.45 | 1.00 | 8.00 | 0.05 | — | — | 1.60 | 1.60 | — | — | Comparative steel |
| K | 0.45 | 0.36 | 0.70 | 2.08 | 0.80 | — | — | 0.60 | — | — | — | " |
| L | 0.35 | 0.30 | 0.20 | 5.00 | 0.15 | — | — | — | — | — | — | Conventional steel |
| M | 0.50 | 0.30 | 0.35 | 1.00 | 0.01 | — | — | 0.02 | — | — | — | " |
| N | 0.55 | 0.20 | 0.30 | 0.01 | 0.01 | — | — | 0.02 | — | — | — | " |
| O | 0.82 | 0.32 | 0.35 | 4.01 | 2.10 | — | — | 5.21 | 6.92 | — | 0.43 | AISI M2 |

Table 2

| Mark | *1 Temper Hardness (HV) | Tensile strength (kg/mm) | Tensile elongation (%) | *2 Fatigue life (Times) | *3 Fatigue life by sawing machine (hr) | *4 Difference in temper hardness (Hv) |
| --- | --- | --- | --- | --- | --- | --- |
| A | 520 | 170 | 6.9 | $2.7 \times 10^4$ | at least 100 | 10 |
| B | 540 | 178 | 6.0 | $2.8 \times 10^4$ | at least 100 | 10 |
| C | 530 | 170 | 6.8 | $2.7 \times 10^4$ | at least 100 | 10 |
| D | 525 | 172 | 7.0 | $3.0 \times 10^4$ | at least 100 | 10 |
| E | 530 | 170 | 7.0 | $3.4 \times 10^4$ | at least 100 | 10 |
| F | 530 | 172 | 6.2 | $2.1 \times 10^4$ | 90 | 10 |
| G | 530 | 171 | 6.3 | $2.9 \times 10^4$ | at least 100 | 10 |
| H | 530 | 170.5 | 6.4 | $2.9 \times 10^4$ | at least 100 | 10 |
| I | 500 | 169 | 6.2 | $2.9 \times 10^4$ | 95 | 12 |
| J | 540 | 180 | 6.8 | $1.8 \times 10^4$ | 95 | 150 |
| K | 530 | 182 | 6.5 | $1.5 \times 10^4$ | 52 | 10 |
| L | 465 | 158 | 6.0 | $1.0 \times 10^4$ | 40 | 10 |
| M | 430 | 149 | 5.0 | $0.8 \times 10^4$ | 30 | 10 |
| N | 420 | 142 | 5.2 | $0.6 \times 10^4$ | 31 | 80 |

*1 Hardness of the test specimen when it was oil quenched at 1200° C and then tempered two times at 560° C × 1 hr.
*2 An initial load of 15 kg/mm² as applied to the test speciment and furthermore a tensile stress of 65 kg/mm² was repeatedly applied thereto.
*3 Time required for fatigue failure of a band saw having wheel on 400 mm in diameter when it was subjected to fatigue test.
*4 Difference between temper hardness at 540° C and temper hardness at 580° C.

Furthermore, pulsating tensile fatigue test which comprises applying an initial load of 15 kg/mm² to the fatigue test specimen which had the same shape as the tensile test specimen and which had a notch of 2 mm in depth and 1 mm in end radius at the center thereof and then repeatedly applying a tensile stress of 65 kg/mm² thereto was carried out to measure the life until breakage. Furthermore, test specimen was worked into a saw blade having the same shape as the actual band saw (1.0 mm in thickness, 25 mm in width and 4 tooth/1 in) and subjected to the heat treatment of the standard heat treating conditions for the high speed steel M2 (oil quenching at 1200° C and tempering of two times at 560° C × 1 hr). Time required for breakage of said saw blade due to fatigue by a sawing machine was measured. As shown in Table 2, the steels A – I of this invention had longer fatigue life than the conventional steels L – M and the life of band saws using the former steels was more than twice that of band saws using the latter steels.

Hardness of the test specimens of 1.0 mm in thickness, 2.5 mm in width and 25 mm in length which were oil quenched from 1200° C and repeatedly tempered to a temperature of 540° – 600° C is shown in the accompanying drawing. The column (4)* in Table 2 shows decrease in hardness when the tempering temperature was raised by 40° C from 540° C.

The comparative steel J which contained a larger amount of Cr than the steels of this invention was comparatively high in fatigue strength, but was much greater in decrease in hardness due to increase in tempering temperature than the steels of this invention. The comparative steel J had the Hv of 150 (the difference in temper hardnesses at 540° C and 580° C). That is, mechanical properties of this steel greatly changed due to a little change in the tempering temperature and saw blade having stable properties cannot be obtained.

The steels of this invention showed substantially no change in hardness due to change in tempering temperature and thus saw blade of stable properties can be produced. The steel K which contained smaller amount of Cr than the steels of this invention had a low fatigue strength.

As mentioned hereinbefore, according to this invention, it is easy to carry out the heat treatment to obtain a back material of a metal band saw which has a good toughness, a high tensile strength and a high fatigue strength even when heat treated under the same conditions as those for a high speed steel as a blade material and moreover which shows substantially no change in hardness with change in tempering temperature of about 560° C and has stable properties.

That is, this invention provides a steel excellent as a back material of metal band saw which uses a high speed steel as a blade material.

What is claimed is:

1. A back material of a metal band saw high in fatigue strength which consists essentially of, by weight, 0.20 – 0.33% C, up to 1.5% Si, up to 1.5% of Mn, 3.5 – 6.5% Cr, 0.05 – 0.40% V, 0.05 – 0.10% Al, 0.02 – 0.30% Nb, at least one of 1.0 – 3.0% Mo and up to 4.0% W and the balance Fe and impurities, the sum of (% Mo) + ½ (% W) being within the range of 1.0 – 3.0%.

2. A back material of a metal band saw high in fatigue strength which consists essentially of, by weight, 0.23 – 0.30% C, up to 0.8% Si, up to 1.0% Mn, 4.0 – 6.0% Cr, 0.05 – 0.40% V, 0.05 – 0.10% Al, 0.02 – 0.30% Nb, 1.4 – 2.6% Mo and the balance Fe and impurities.

3. A back material of a metal band saw high in fatigue strength which consists essentially of, by weight, 0.23 – 0.30% C, up to 0.8% Si, up to 1.0% Mn, 4.0 – 6.0% Cr, 0.05 – 0.40% V, 0.05 – 0.10% Al, 0.02 – 0.30% Nb, 1.0 – 2.4% Mo, 0.8 – 2.0% W and the balance Fe and impurities.

4. A back material of a metal band saw high in fatigue strength which consists essentially of, by weight 0.20 – 0.33% C, up to 1.5% Si, up to 1.5% Mn, 3.5 – 6.5% Cr, 0.05 – 0.40% V, 0.05 – 0.10% Al, 0.02 – 0.30% Nb, at least one of 1.0 – 3.0% Mo and up to 4.0% W, at least one of up to 1.5% Ni and up to 1.4% Co and the balance Fe and impurities, the sum of (% Mo) + ½ (% W) being within the range of 1.0 – 3.0%.

5. A back material of a metal band saw high in fatigue strength which consists essentially of, by weight, 0.23 – 0.30% C, up to 0.8% Si, up to 1.0% Mn, 4.0 – 6.0% Cr, 0.05 – 0.40% V, 0.05 – 0.10% Al, 0.02 – 0.30% Nb, 1.4 – 2.6% Mo, at least one of 0.4 – 1.2% Ni and 0.4 – 0.9% Co and the balance Fe and impurities.

6. A back material of a metal band saw high in fatigue strength which consists essentially of, by weight, 0.23 – 0.30% C, up to 0.8% Si, up to 1.0% Mn, 4.0 – 6.0% Cr, 0.2 – 0.4% V, 0.05 – 0.10% Al, 0.02 – 0.30% Nb, 1.4 – 2.6% Mo, 0.4 – 1.2% Ni and the balance Fe and impurities.

7. A back material of a metal band saw high in fatigue strength which consists essentially of, by weight, 0.23 - 0.30% C, up to 0.8% Si, up to 1.0% Mn, 4.0 - 6.0% Cr, 0.2 - 0.4% V, 0.05 - 0.10% Al, 0.02 - 0.30% Nb, 1.4 - 2.6% Mo, 0.4 - 0.9% Co and the balance Fe and impurities.

8. A back material of a metal band saw high in fatigue strength which consists essentially of, by weight, 0.23 - 0.30% C, up to 0.8% Si, up to 1.0% Mn, 4.0 - 6.0% Cr, 0.05 - 0.4% V, 0.05 - 0.10% Al, 0.02 - 0.30% Nb, at least one of 1.0 - 2.4% Mo and 0.8 - 2.0% W, at least one of 0.4 - 1.2% Ni and 0.4 - 0.9% Co and the balance Fe and impurities, the sum of (% Mo) + ½ (% W) being within the range of 1.0 - 3.0%.

9. A back material of a metal band saw high in fatigue strength which consists essentially of, by weight, 0.23 - 0.3% C, up to 0.8% Si, up to 1.0% Mn, 4.0 - 6.0% Cr, 0.2 - 0.4% V, 0.05 - 0.10% Al, 0.02 - 0.30% Nb, at least one of 1.6 - 2.4% Mo and 0.8 - 2.0% W, 0.4 - 1.2% Ni and the balance Fe and impurities, the sum of (% Mo) + ½ (% W) being within the range of 1.0 - 3.0%.

10. A back material of a metal band saw high in fatigue strength which consists essentially of, by weight, 0.23 - 0.30% C, up to 0.8% Si, up to 1.0% Mn, 4.0 - 6.0% Cr, 0.2 - 0.4% V, 0.05 - 0.10% Al, 0.02 - 0.30% Nb, at least one of 1.6 - 2.4% Mo and 0.8 - 2.0% W, 0.4 - 0.9% Co and the balance Fe and impurities, the sum of (% Mo) + ½ (% W) being within the range of 1.0 - 3.0%.

11. A metal band saw which comprises a blade material of a high speed steel and a back material defined in claim 1.

12. A back material of a metal band saw according to claim 1, consisting essentially of, by weight, 0.28% C, 0.36% Si, 0.82% Mn, 5.06% Cr, 0.30% V, 0.07% Al, 0.09% Nb, 2.20% Mo, and the balance Fe and impurities.

13. A back material of a metal band saw according to claim 1, consisting essentially of, by weight, 0.29% C, 0.35% Si, 0.80% Mn, 5.12% Cr, 0.29% V, 0.06% Al, 0.12% Nb, 1.62% Mo, 1.04% W, and the balance Fe and impurities.

14. A back material of a metal band saw according to claim 4, consisting essentially of, by weight, 0.25% C, .26% Si, 0.68% Mn, 5.04% Cr, 0.36% V, 0.06% Al, 0.10% Nb, 2.03% Mo, 0.60% Ni, and the balance Fe and impurities.

15. A back material of a metal band saw according to claim 4, consisting essentially of, by weight, 0.26% C, 0.36% Si, 0.73% Mn, 5.06% Cr, 0.33% V, 0.07% Al, 0.12% Nb, 2.06% Mo, 0.86% Co, and the balance Fe and impurities.

16. A back material of a metal band saw according to claim 4, consisting essentially of, by weight, 0.27% C, 0.37% Si, 0.79% Mn, 5.10% Cr, 0.33% V, 0.06% Al, 0.10% Nb, 2.10% Mo, 0.46% Ni, 0.44% Co, and the balance Fe and impurities.

17. A back material of a metal band saw according to claim 4, consisting essentially of, by weight, 0.25% C, 0.25% Si, 0.69% Mn, 5.00% Cr, 0.37% V, 0.07% Al, 0.11% Nb, 1.64% Mo, 1.05% W, 0.60% Ni, and the balance Fe and impurities.

18. A back material of a metal band saw according to claim 4, consisting essentially of, by weight, 0.27% C, 0.40% Si, 0.69% Mn, 5.20% Cr, 0.34% V, 0.06% Al, 0.05% Nb, 1.60% Mo, 1.10% W, 0.70% Co, and the balance Fe and impurities.

19. A back material of a metal band saw according to claim 4, consisting essentially of, by weight, 0.27% C, 0.41% Si, 0.70% Mn, 5.10% Cr, 0.36% V, 0.07% Al, 0.05% Nb, 1.58% Mo, 1.20% W, 0.50% Ni, 0.46% Co, and the balance Fe and impurities.

20. A back material of a metal band saw according to claim 1, consisting essentially of, by weight, 0.28% C, 0.37% Si, 0.36% Mn, 5.00% Cr, 0.30% V, 0.06% Al, 0.06% Nb, 2.0% W, and the balance Fe and impurities.

* * * * *